United States Patent [19]

Goldstein

[11] Patent Number: 4,480,445

[45] Date of Patent: Nov. 6, 1984

[54] THERMAL STORAGE HEAT EXCHANGER SYSTEMS OF HEAT PUMPS

[76] Inventor: Vladimir Goldstein, 60 Basaltic Rd., Unit 9, Maple, Ontario, Canada, L0J 1E0

[21] Appl. No.: 459,747

[22] Filed: Jan. 21, 1983

[51] Int. Cl.$^3$ .............................................. F25D 17/02
[52] U.S. Cl. ......................................... 62/434; 62/96; 62/123; 62/185
[58] Field of Search ................... 62/185, 434, 96, 123

[56] References Cited

U.S. PATENT DOCUMENTS

| | | | |
|---|---|---|---|
| 3,247,678 | 4/1966 | Mohlman | 62/185 |
| 4,078,392 | 3/1978 | Kestner | 62/434 |
| 4,294,083 | 10/1981 | King | 62/434 |
| 4,302,944 | 12/1981 | Gainer | 62/434 |
| 4,334,412 | 6/1982 | Wildfeuer | 62/434 |

Primary Examiner—Ronald C. Capossela
Attorney, Agent, or Firm—Fetherstonhaugh & Co.

[57] ABSTRACT

In a heat pump having a heat source, a heat sink and a thermal storage heat exchanger in which heat energy is cyclically accumulated and discharged by circulation of a secondary refrigerant therethrough, the improvement wherein: the secondary refrigerant is a aqueous solution having a concentration which is below its Eutetic concentration, the heat sink is adapted to super cool the aqueous solution to partially freeze it to generate a partially frozen solution in which fine ice particles are retained in suspension, the thermal storage heat exchanger has a storage chamber adapted to receive said partially frozen solution from the heat sink and to separate the ice particles from the liquid phase refrigerant to form a porous ice bed and a substantially ice free liquid bath, and wherein the thermal storage heat exchanger is adapted to receive heated refrigerant and to discharge the heated refrigerant into said chamber such that it is placed in intimate contact with the ice bed in a manner such that it may pass through the pores of the porous ice bed prior to its return to the bath.

6 Claims, 3 Drawing Figures

THERMAL STORAGE HEAT EXCHANGER SYSTEMS OF HEAT PUMPS

FIELD OF INVENTION

This invention relates to improvements in heat pumps which may be used for heating or cooling and which have a thermal storage heat exchangers.

PRIOR ART

Thermal storage heat exchangers are commonly used in heat pumps in systems such as air conditioning systems in order to shift the loads which are applied to the system to achieve load leveling and avoid the need to provide a pump which is designed to meet the maximum load requirements when maximum load requirements are only required for a limited period of its day-to-day operation.

Heat pump systems which incorporate heat source, heat sink and a thermal storage heat exchanger are well known and the present invention is directed to improvements in such systems.

In U.S. Pat. No. 4,334,412 dated June 15, 1982, a cooling system is disclosed in which an ice slurry is circulated as the secondary refrigerant. A motor driven agitator is provided in the collection means for maintaining the ice in a slurry and this slurry is circulated through the system. To maintain the ice in a slurry form, it will be necessary to prevent a high concentration of ice in the collection device and as a result, the efficiency of the collection device will be somewhat limited.

In order to provide a thermal storage heat exchanger of high efficiency, I separate ice from the liquid phase refrigerant in the thermal storage heat exchanger so as to form a porous ice bed and a bath of secondary refrigerant within the thermal storage heat exchanger. This enables me to accumulate a denseporous ice bath during the cooling stage and through which I can pass the heated refrigerant in order to recover the stored energy during the peak cooling demand condition.

A refrigerant which is suitable for use in my system is a secondary refrigerant in the form of a binary solution having a concentration which is below its Eutectic concentration.

In order to generate a partially frozen refrigerant solution in which fine ice particles are retained in suspension, I use an ice making machine of the type described in my co-pending application Ser. No. 419,548 filed Sept. 17, 1982, the complete specification of which is incorporated herein by reference.

SUMMARY OF INVENTION

According to one aspect of the present invention, there is provided in a heat pump having a heat source, a heat sink and a thermal storage heat exchanger in which heat energy is cyclically accumulated and discharged by circulation of a secondary refrigerant therethrough, the improvement wherein: the secondary refrigerant is an aqueous soluation having a concentration which is below its eutetic concentration, the heat sink is adapted to super cool said solution to partially freeze it to generate a partially frozen solution in which fine ice particles are retained in suspension, the thermal storage heat exchanger has a storage chamber adapted to receive said partially frozen solution from the heat sink and to separate the ice particles from the liquid phase refrigerant to form a porous ice bed and a substantially ice free liquid bath, and wherein the thermal storage heat exchanger is adapted to receive heated refrigerant and to discharge the heated refrigerant into said chamber such that it is placed in intimate contact with the ice bed in a manner such that it may pass through the pores of the porous ice bed prior to its return to the bath.

PREFERRED EMBODIMENT

The invention will be more clearly understood after reference to the following detailed specification read in conjunction with the drawings wherein.

Figure 1:
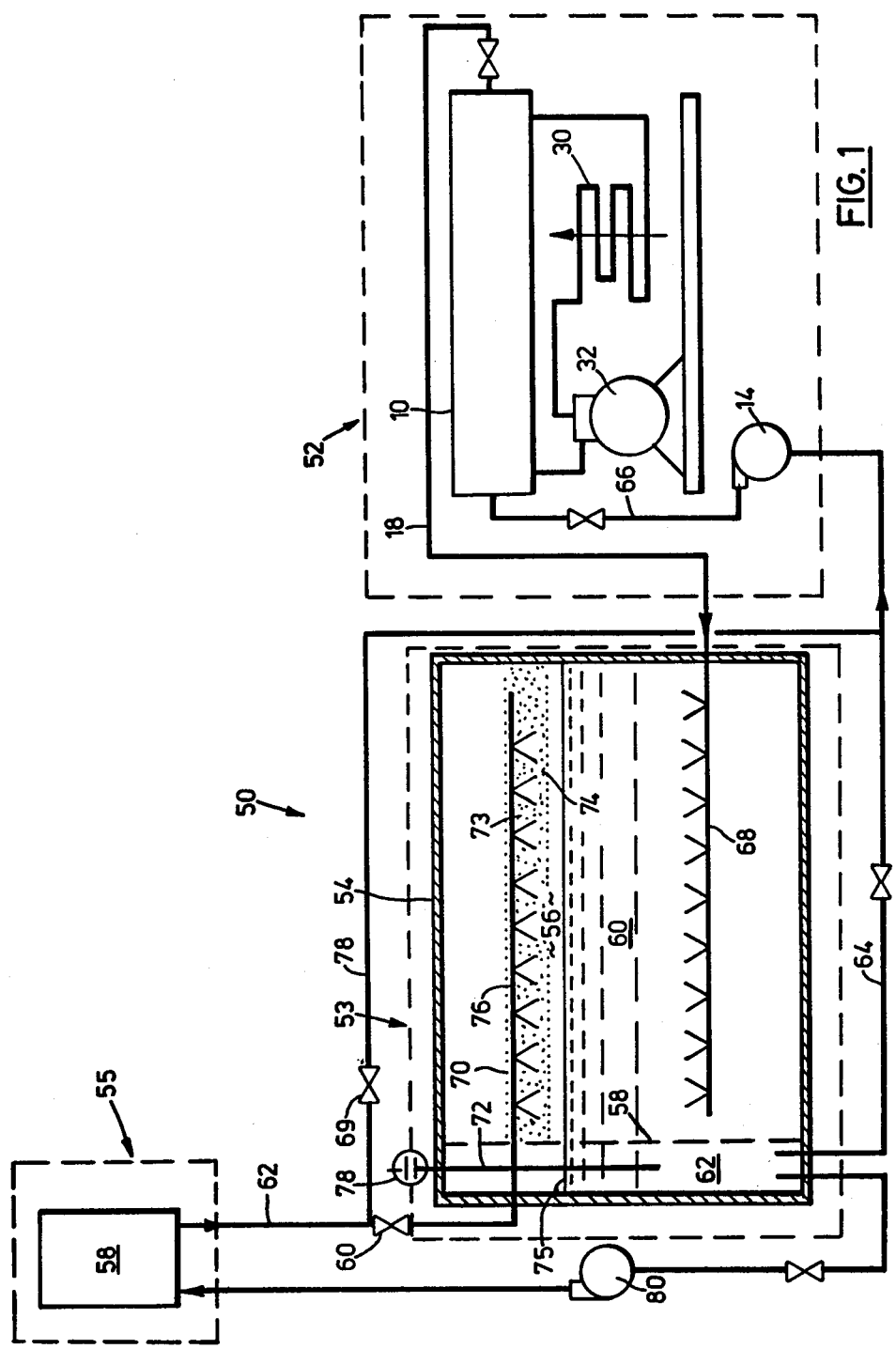
FIG. 1 is a diagram of a heat pump system constructed in accordance with an embodiment of the present invention.

With reference to FIG. 1 of the drawings the reference numeral 50 refers generally to a heat pump according to an embodiment of the present invention. The heat pump consists of an ice generator generally identified by the reference numeral 52, a heat source generally identified by the reference numeral 55 and a thermal storage heat exchanger generally identified by the reference numeral 53. The ice generator will be described in detail herein after with reference to FIG. 2 of the drawings. It will be noted that the output line 18 of the ice generator communicates with the thermal storage heat exchanger tank 56.

In the embodiment illustrated, the heat source 55 is in the form of a heat load device 58 which may be a heat exchanger in the form of a cooling coil, solar collector, chiller or the like.

The thermal storage heat exchanger 53 comprises a storage tank 54 within which a storage chamber 56 is formed. A barrier wall 58 serves to divide the storage chamber 56 into a first compartment 60 and a second compartment 62. The barrier wall 58 is porous and serves to permit liquid phase refrigerant to pass from the compartment 60 into the compartment 62 while preventing the passage of ice particles therebetween.

During the thermal storage phase of operation, the circulating pump 14 withdraws liquid phase secondary refrigerant from the second compartment 62 through a line 64 and discharges it under pressure into the ice generator 10 through line 66. The partially frozen solution containing the ice particles is discharged from the heat sink 52 through line 18 and enters the first chamber 60 through a return header 68 which is disposed in the lower end of the first compartment 60. The ice particles will float toward the surface 70 of the body of secondary refrigerant which is stored within the storage chamber 56 wherein they will accumulate to form a porous ice bed 74.

By reason of the fact that the secondary refrigerant is an aqueous solution, the ice particles will not bridge to form a solid ice mask and consequently the ice bed which is formed, will be porous. This condition will remain even when the ice bed is compacted as a result of its buoyancy to form a compact ice bed which may substantially fill the chamber 60.

In order the avoid a situation where an excessive amount of ice is accumulated in the storage chamber 60, I provide a liquid level sensing device 78 which has a probe 72 which extends into the compartment 62. When the level of liquid in the compartment 62 drops below a predetermined level such as that indicated by the broken line 75, the sensor 70 will be activated to deactivate the ice generator 52.

Liquid phase refrigerant is withdrawn from the second compartment 62 by means of the circulating pump 80 of the heat source and it is circulated through the heat exchanger 58. A valve 60 is provided in the output line 62 of the solar collector. The valves 60 and 69 are operable to direct the heated refrigerant to the return header 76 of the thermal storage heat exchanger or the return line 78 which is connected to the circulating pump 14 of the ice generator. This circuit is made operational during high load demand periods and may be used to moderate the cooling effect.

The return header 76 is arranged to discharge the heated liquid phase refrigerant into contact with the ice bed such that the heated refrigerant must pass through at least a major portion of the ice bed before it can be withdrawn from the first compartment 62, thus ensuring that it is cooled by contact with the ice bed. The porous nature of the ice bed is such that the heated refrigerant will pemiatr the ice bed to thereby achieve an efficient heat exchange between the ice bed and the refrigerant.

A secondary refrigerant suitable for use in the system of the present invention may be a brine solution having a 5% to 10% concentration. Preferably, however, the themal storage medium is an aqueous solution having a glycol concentration in the range of 3% to 10% by weight. A suitable 10% glycol themal storage medium may have the following properties:

| | |
|---|---|
| SPECIFIC HEAT | 0.982 BTU/LB/°F. |
| FREEZING POINT | APPROX 27° F. |
| THERMAL CONDUCTIVITY (27°) | 0.309 BTU/HR-FT$^2$-F/FT |
| VISCOSITY (27°) | 2.8 CENTIPOISES |
| DENSITY | 8.77 LB/IMP. GAL. |

Figure 2:
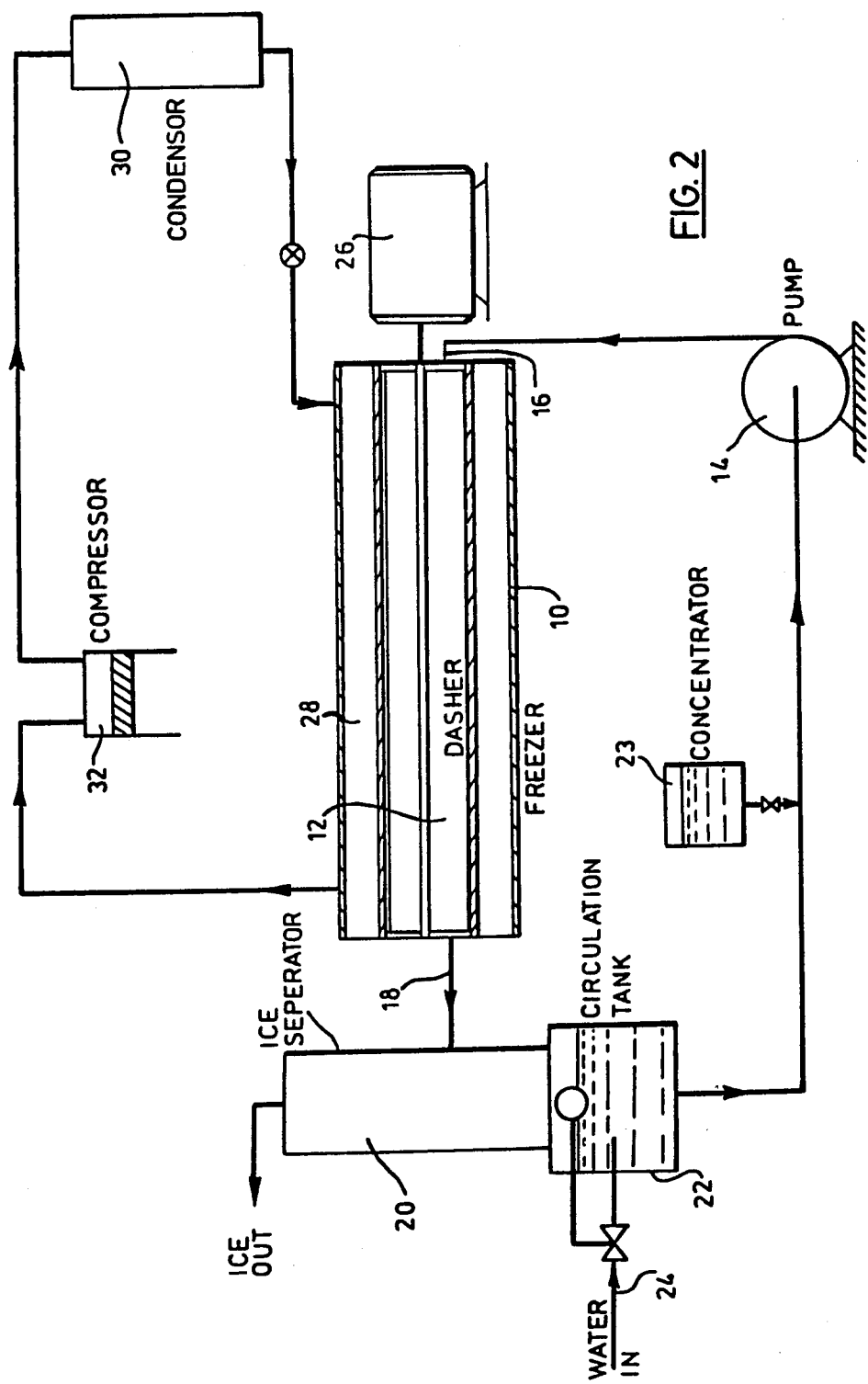
FIG. 2 is a schematic illustration of a heat sink suitable for use in super cooling a binary solution.

With reference to FIG. 2 of the drawings, the reference numeral 10 refers generally to a freezing cylinder which has a dasher chamber 12 through which a brine mixture is continuously circulated by means of a pump 14. The brine mixture enters the chamber at 16 and is cooled to be partially frozen to generate a partially frozen solution in which fine ice particles are retained in suspension. The mixture is then discharged through line 18 to the thermal storage heat exchanger 20 (FIG. 2).

Within the dasher chamber, a scouring paddle is continuously rotated by motor 26 to scour the sides of the chamber and to prevent an ice build-up on them. The scouring paddle is of a standard design in these machines. The dasher chamber is surrounded by a jacket 28 to which a condensed refrigerant is continuously supplied from condenser 30. The refrigerant boils in the jacket and as it does so, it cools the brine mixture in the chamber to form the ice particles. The expanded refrigerant travels from the jacket to the compressor 32 where it is compressed and delivered to the condenser for continuous recycling as in a conventional refrigeration cycle.

As indicated, the freezer, dasher and scouring paddle and associated refrigerant circuit are standard and well known pieces of equipment and are not therefore described in detail.

With reference to FIG. 2 of the drawings, the characteristic curves of a brine mixture is disclosed in which the solvent is water and the solute is NaCl.

This solution will freeze at the Eutectic temperature or temperature of Eutectic indicated in the drawing. The physical phenomena that occur as the temperature of such a solution is cooled toward the freezing point depends upon its concentration. If the concentration is represented by a point to the left of the point D1 of the curve, ice crystals are formed and the concentration of the solvent in the solute increases as the freezing temperature is approached.

The temperature represented by the point D on the curve is known as the eutectic temperature and the concentration represented by the point $D_1$ on the curve is known as the Eutectic concentration.

Figure 3:
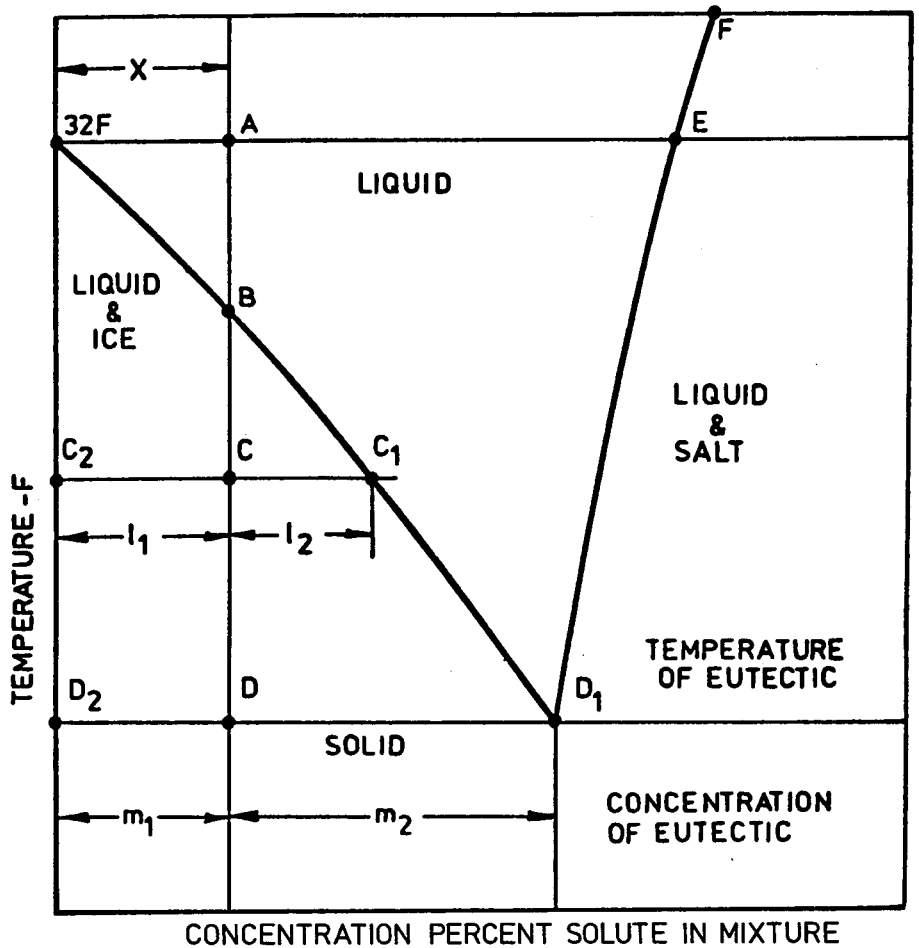
FIG. 3 is a diagram illustrating a temperature concentration curve of an aqueous solution suitable for use as a secondary refrigerant.

Referring to FIG. 3, if a solution of concentration x, less than the eutectic, at a temperature above 32 F., is cooled, it will not solidify when 32 F. is reached (point A), but continue to cool as a liquid until point B is reached. At this point, ice crystals of pure water will begin to form, accompanied by removal of their latent heat. This increases the concentration of the residual solution. As the temperature is lowered, these crystals continue to form, and the mixture of ice crystals and brine solution forms a slush. When point C is reached, there is a mixture of ice crystals $C_2$, and brine solution of concentration $C_1$, in the proportions of $1_1$ parts of the brine to $1_2$ parts of ice crystals in $(1_1+1_2)$ parts of mixture. When the process has continued to point D, there is a mixture of $m_1$ parts of eutectic brine solution $D_1$, and $m_2$ part of ice $D_2$, all of the eutectic temperature. As more heat is removed, the $m_1$ parts of eutectic brine freeze at uniform temperature until all latent heat is removed. The frozen eutectic is a mechanical mixture of salt and frozen water, not a solution, and consequently the latent heat must be corrected for the heat of solution. If this is positive, it decreases effective latent heat; if negative, it increases the effective latent heat.

The ice particles which are formed by the ice generator have a diameter of about 0.002 to 0.005 inches and are made from and float in a proprietary binary solution containing water and emulsifying, antibacterial, antifungal and anticorrosive agents. The liquid also has controlled amounts of alcohol or glycol (for thermal storage applications) so that the working temperature may be set at 28 F. The ice crystals remain separated and do not form solid blocks of ice because the emulsifier prevents them from agglomerating in the binary solution. Since they do remain separated, the ice crystals have a higher heat transfer coefficient than solid ice and require no space-stealing freezer tubes in the storage tank and do not "bridge" in storage like conventional ice does.

For the purposes of this specification, the term "heat pump" is to be interpreted as any heating or cooling device which incorporates a heat sink, a heat source and a thermal storage heat exchanger used for heating or cooling.

Various modifications of the present invention will be apparent to those skilled in the art. For example, the thermal storage heat exchanger of the present invention may be incorporated in a conventional heat exchanger system.

I claim:

1. In a heat pump having a heat source, a heat sink and a thermal storage heat exchanger in which heat energy is cyclically accumulated and discharged by circulation of a secondary refrigerant therethrough, the improvement wherein:
  (i) the secondary refrigerant is an aqueous solution having a concentration which is below its eutetic concentration,
  (ii) the heat sink is adapted to super cool the aqueous solution to partially freeze it to generate a partially frozen solution in which fine ice particles are retained in suspension in a liquid secondary refrigerant,
  (iii) the thermal storage heat exchanger has a storage chamber which is divided by a porous divider, into a first and second enclosures, said heat sink having an intake line communicating with said first enclosure for withdrawing liquid secondary refrigerant therefrom and an output communicating with said second enclosure for discharging said partially frozen secondary refrigerant into said second enclosure wherein said ice particles separate from the liquid to form a porous ice bed and a substantially ice free liquid bath, said heat source having an intake communicating with said first enclosure through which liquid secondary refrigerant is withdrawn from said chamber and an output communicating with said second enclosure through which heated liquid secondary refrigerant is discharged into said second enclosure such that it is placed in intimate contact with the ice bed in a manner such that it may pass through the pores of the porous ice bed prior to its return to the bath.

2. A heat pump as claimed in claim 1 wherein the ice bed is formed so that it floats on said bath such that the ice bed is compressed by its own buoyancy to form a compact high density porous ice bed.

3. A heat pump as claimed in claim 1 wherein the heated refrigerant is returned to said chamber a substantial distance above the bath and wherein the liquid phase refrigerant is withdrawn from the bath at a level below the ice bed.

4. A heat pump as claimed in claim 1 wherein the heated refrigerant is returned to the chamber at a level above the ice bed.

5. A heat pump as claimed in claim 1 wherein the partially frozen binary solution is admitted to the chamber at a level below the ice bed such that the ice particles float upwardly to form the ice bed in use.

6. A heat pump as claimed in claim 1 further comprising a bath level sensing device for monitoring the level of the bath in the chamber, said sensing device being operable to deactivate said heat sink when the level of liquid phase refrigerant in the bath drops below a predetermined level.

* * * * *